(12) United States Patent
Hoyashita et al.

(10) Patent No.: US 6,865,368 B2
(45) Date of Patent: Mar. 8, 2005

(54) SYSTEM AND METHOD FOR PRODUCING EDUCATIONAL MATERIAL

(75) Inventors: Shigeru Hoyashita, Saga (JP); Yasuyuki Ikegami, Saga (JP); Kazuhiro Sumi, Saga (JP)

(73) Assignee: Saga University, Saga (JP)

( * ) Notice: Subject to any disclaimer, the term of this patent is extended or adjusted under 35 U.S.C. 154(b) by 264 days.

(21) Appl. No.: 10/184,983

(22) Filed: Jul. 1, 2002

(65) Prior Publication Data

US 2003/0013070 A1 Jan. 16, 2003

(30) Foreign Application Priority Data

Jul. 6, 2001 (JP) ........................................ 2001-205631

(51) Int. Cl.[7] ................................................. G09B 3/00
(52) U.S. Cl. ...................... 434/350; 434/118; 434/362; 706/927; 707/104.1
(58) Field of Search .............................. 434/118, 169, 434/307 R, 322, 323, 350, 362, 365; 706/927; 707/104.1; 725/74, 78

(56) References Cited

U.S. PATENT DOCUMENTS

| 5,173,051 A | 12/1992 | May et al. |
| 5,261,823 A | 11/1993 | Kurokawa |
| 5,385,475 A | 1/1995 | Sudman et al. |
| 5,441,415 A | 8/1995 | Lee et al. |
| 5,864,869 A * | 1/1999 | Doak et al. ............... 707/104.1 |
| 6,091,930 A | 7/2000 | Mortimer et al. |
| 6,149,441 A * | 11/2000 | Pellegrino et al. ........... 434/350 |
| 6,178,308 B1 * | 1/2001 | Bobrow et al. ............. 434/350 |
| 6,201,948 B1 * | 3/2001 | Cook et al. .................. 434/350 |
| 6,470,171 B1 * | 10/2002 | Helmick et al. ............. 434/362 |
| 6,561,812 B1 * | 5/2003 | Burmester et al. .......... 434/365 |
| 2002/0055089 A1 * | 5/2002 | Scheirer ....................... 434/350 |
| 2002/0115052 A1 * | 8/2002 | Anderson et al. ........... 434/350 |
| 2002/0138841 A1 * | 9/2002 | Ward ............................ 725/78 |
| 2003/0039949 A1 * | 2/2003 | Cappellucci et al. ........ 434/362 |
| 2004/0115596 A1 * | 6/2004 | Snyder et al. ............... 434/118 |

FOREIGN PATENT DOCUMENTS

| CN | 1268707 A | 10/2000 |
| JP | A-10-187022 A | 7/1998 |
| JP | A-10-301468 | 11/1998 |
| JP | 2000-250393 A | 9/2000 |
| KR | 2000-58885 | 10/2000 |
| KR | 2000-72586 | 10/2000 |

* cited by examiner

*Primary Examiner*—Joe H. Cheng
(74) *Attorney, Agent, or Firm*—Oliff & Berridge, PLC (57) ABSTRACT

A system for producing an educational material for students. The system has a storing part for storing raw educational materials into a database, an input part for inputting both student-related data and educational environment-related data, and an educational material producing unit for selecting at least one raw educational material from said database based on predetermined selecting criteria and the inputted student-related data and educational environment-related data to produce educational material from the selected at least one raw educational material.

14 Claims, 8 Drawing Sheets

| Student-related & educational enviroment-related description |||||
|---|---|---|---|---|
| Subject name | School year | Age | Student name ||
| School name || Teacher name | Learning time ||
| Item A || Ability rating, learning history, ···etc. |||
| Item B || Locality, school environment, skill in teaching, ···etc. |||
| Item C || Infrastructure, network, ···etc. |||

Teaching guidelines

| | (Learning plan TOD) | (Actual TOD) | Remarks | |
|---|---|---|---|---|
| Chapter 1 | Coverage, key point Point of concern | Teacher's comments | Learning status (transmitted from student) | Evaluation, Modify the next goal |
| | (Learning plan TOD) | (Actual TOD) | Remarks | |
| Chapter 1 | | | | |
| Chapter 1 | | | | |
| | | | | |
| | | | | |

FIG. 8

| Student-related & educational enviroment-related description |||||
|---|---|---|---|---|
| Subject name | School year | Age | Student name ||
| School name || Teache name | Learning time ||
| Item A || Ability rating, learning history,···etc. |||
| Item B || Locality, school enviroment, skill in teaching,···etc. |||
| Item C || Infrastructure, network,···etc. |||
| Evaluation description |||||

| Learning TOD || Evaluation by teacher | Evaluation by student | Pemarks (parent's comment,···) |
|---|---|---|---|---|
| Chapter 1 | A.M.9:00 May 5, 1998 | | | |
| Chapter 2 | P.M.3:00 | | | |
| | | | | |
| | | | | |

Total evaluation

| Student | Next goal |
|---|---|
| | |
| Educational material | Remarks (Review, things to keep in mind, etc.) |

Evaluate teacher
(by senior teacher)

SYSTEM AND METHOD FOR PRODUCING EDUCATIONAL MATERIAL

BACKGROUND OF THE INVENTION

1. Field of the Invention

The present invention relates to a system and a method for producing educational materials, and more particularly, relates to a system and a method for producing educational materials, which are customized upon respective abilities and respective environments of respective users (i.e. a student, a teacher, parents) using database.

2. Related Art Statements

A conventional educational material is a typically standardized school textbook provided by major publisher. For instance, in a school textbook for first grade in Japan, it is often the case that a visual scene of walking around a schoolyard lined with cherry trees in full bloom in April (which is a season of an entrance ceremony in Tokyo in Japan) is illustrated for expressing pleasure of students in an entrance ceremony. Although cherry trees open out in April in Tokyo city, they come out in February in Okinawa and they open out in May in Hokkaidou. Therefore, the cherry blossom does not properly express pleasure of students in an entrance ceremony. In such a way, conventional textbooks of Japan are generally standardized in a view of Tokyo city and they are published on the basis of a regional environment of Tokyo-centrism. For example, even if students in Okinawa watch a cherry blossom picture in a textbook, which opens out in April in Tokyo and which is scheduled in April curriculum, since cherry blossom dose not open out in April in Okinawa, the student in Okinawa cannot smell and feel real cherry blossom in that time. Accordingly the students don't greatly impressed by the flower shown in the textbook.

As described above, the conventional educational materials are published with disregard to regional characteristics of respective students. That is, various scenes with disregard to regionality are illustrated in drawings of textbooks. Such standardized textbooks could not heighten sensitivity of students.

Additionally, in a conventional educational environment, teacher ability is not considered,

SUMMARY OF THE INVENTION

It is an object of the present invention to provide a system and a method for producing an educational material in consideration of ability or personality of respective students, leaning progress, an educational environment, an educational policy of a school, and ability or personality of respective teachers.

The present system and the method according the present invention provide three types of educational materials. Although first type of educational material (i.e. normal type) is similar to ordinary textbook at the fist face, the first type of educational material is produced based upon characteristics of respective students and opinions of parents/students. Second type of educational material is produced upon self-initiative of the students, and provides blanks to let the student to write anything, in which a student is interested, to develop student's independence and a positive attitude. That is, the second type is a portfolio type of educational material such as a worksheet or a workbook.

The present system and method provide the third type educational material which is a mixture of the first (normal) type and the second (portfolio) type based upon respective student abilities. Mixture ratio of the hybrid type educational material is determined by ability and/or leaning level of respective students. It is noted that educational materials provided by this system may be utilized in various training ground, such as a school, a school in the "miscellaneous" category, or a culture center, etc, and the term "student" includes a person who is taught such as a pupil, a preschooler, or a school student. That is the present invention is not only for students but also for various persons such as employees of a company.

In order to attain the above mentioned object, a system for producing an educational material according the invention comprises:

storing means for storing raw educational materials into a database;

input means for inputting both student-related data and educational environment-related data; and educational material producing means for selecting at least one raw educational materials from said database based on predetermined selecting criteria and said inputted both student-related data and educational environment-related data to arrange said selected at least one raw educational material based upon a predetermined edition pattern to produce an educational material from said selected at least one raw educational material.

According to the present invention, it is possible to easily and properly provide the educational material which is customized to each student by inputting student-related data (e.g., subject, academic year, age, leaning ability, leaning history, or autonomy of a student, etc.) and educational-environment data (e.g. personality, faculty to teach, yeas of experience, achievement of a teacher, or environment of a school or home, etc.) and selecting any raw educational material based upon the student-related data, educational-environment data and predetermined selecting criteria.

For instance, it is assumed that a target student is in $3^{rd}$ grade and he resides in x-area. To produce textbook about natural science for him, the present system prompts a user (e.g., a teacher, a student or a parent) to input following student-related data and educational environment data: "natural science" as subject, $3^{rd}$ grade as school year, and x-area as locality. The present system automatically produces an educational material, which is customized to this student upon the inputted data and the predetermined selecting criteria. For producing educational materials for elementary school to high school students, it is preferable that the "predetermined selecting criteria" is arranged by reference to "official guide to teaching" and "time allocation" by Education Ministry. The official guide to teaching has an influence on content of the educational materials. The time allocation has an impact on a volume i.e. page count. In addition the selecting criteria can be discretionary and freely defined by teachers or parents.

For example, "official guide to teaching" by Education Ministry in Japan for natural science to $3^{rd}$ grade defines three chapter: "Animate Beings and its environment", "Substance and Energy", and "Earth and Outer space". When the selecting criteria is made from said official guide, the present system will produce an educational material including the three chapters described above for the $3^{rd}$ grade student.

Additionally, in this case the "Animate Beings and its environment" of the official guide defines to observe about several accessible plants by cultivating to comprehend the growth of plants, thus the educational material will include this content. When the student resides in x-region and this locality is inputted as educational environment-related data, the present system may produce the educational material including any plants or insects peculiar to x-area as a content.

A student, a parent or a teacher can modify the educational material produced by the present system. It is preferable that a teacher rearranges a format of the educational material to adapt it to respective students.

A teacher inputs some pieces of data related to both a student and leaning environment, and the system then produces an educational material. A teacher, a student, or parents check whether or not the educational material is well adapted a target student. After the educational material is utilized by the student and the teacher, the educational material, its raw educational materials and evaluation of the educational material are stored into a database for leaning management. These data can be utilized for generating next educational material for the target student or any student.

An educational environment of area in which students reside (e.g., culture, history, and geographical position, etc.) is important and the educational environment is inputted as educational environment data to utilize this data. For example, when the present system determines that the target student resides near the sea based on the inputted educational environment data, the system produces an educational material, which includes marine products industry or marine wildlife as content. Accordingly, since the target student has a tendency to feel immensely attracted to marine wildlife, the educational material including a content of marine wildlife can more effectively attract the target student and can improve motivation for leaning of the target student.

In a preferable embodiment of the system for producing an educational material according to the present invention, said educational material and/or said raw educational materials comprise an element of a text, a still image, a motion picture, an illustration, a photograph, a figure, a graph or a sound.

According to the embodiment of the present invention, it makes it possible to provide an educational material, which utilizes various elements such as a text or notion picture. Since visualized educational material is produced, the student can more effectively and easily learn using the educational material.

In another embodiment of the system for producing an educational material according to the present invention, said educational material is a normal type to which teachers instruct with reference, a portfolio type which is recordable by a student and i.e. which is voluntary filled any data along with a course object by the student, or a hybrid type which is a mixture of the normal type and portfolio type based upon respective student abilities.

According to this embodiment of the present invention, the present system can provide various types of educational materials in response to any purposes. The present system can provide a portfolio type as well as an ordinary type of educational material. The portfolio type of educational material is better suited for so-called "Project-based Leaning" or "Active Leaning". In the case of the portfolio type of educational material, it may include any hints such as several keywords and URLs for serving as a useful reference. Of course such hints can be automatically selected in accordance with the independence of the student and degree of ability of the teacher (i.e., student-related data or educational environment-related data) and the selected hints can be included in the educational material.

In still another embodiment of the system for producing an educational material according to the present invention, said educational material producing means comprises means for generating a guide to teaching and/or an evaluation sheet based upon the inputted student-related data, educational environment-related data, the selected raw materials, or the produced educational material.

According to this embodiment of the present invention, the guide to teaching and the evaluation sheet, which are adapted to respective educational material customized for respective students, can easily and automatically are generated.

In still another embodiment of the system for producing an educational material according to the present invention, the system further comprises evaluating means for evaluating earnestness or leaning outcome of the respective students by capturing images of the student using a CCD camera while the student takes a lecture using the produced educational material and means for transmitting the evaluated results to a parent-client PC.

In still another embodiment of the system for producing an educational material according to the present invention, said database can be one or more database which is managed by any administrator. The present system further comprises database for leaning management, which is managed by school-related persons or a third party entrusted by school. The educational material provided this system can be utilized by a student, a teacher or a third party and can be presented on a screen of a PC, or may be printed on paper.

In still another embodiment of the system for producing an educational material according to the present invention, said database can be a normal database or a dedicated database for education. The present system can search for desired information using a search engine from said database. Files stored in said database can be managed and sorted by both file-types and file-attributes (such as hidden file attribute). The present system further comprises means for gathering the information such as file information (types, attributes, and updating date, etc.) the evaluation results and any comments from client PC (a student, a teacher or a parent) in real time or batch process.

In still another embodiment of the system for producing an educational material according to the present invention, said database and present system can be accessible from anywhere in the world via network using PC, web-TV, or STB.

By way of easily explanation the aspect of the present invention has been mainly described as systems i.e. devices, however it is understood that the present invention may be realized as methods corresponding to the systems, programs embodying the methods as well as a storage media storing the programs.

For example, according to another aspect of the present invention, a method for producing an educational material comprises the steps of:

storing raw educational materials into a database;

inputting both student-related data and educational environment-related data; and selecting at least one raw educational material from said database based upon predetermined selecting criteria and said inputted both student-related data and educational environment-related data to produce an educational material from said selected at least one raw educational material.

In an embodiment of the method for producing an educational material according to the present invention, said educational material and/or said raw educational materials comprise an element of a text, a still image, a motion picture, an illustration, a photograph, a figure, a graph or a sound.

In another embodiment of the method for producing an educational material according to the present invention, said educational material is a normal type to which teachers instruct with reference, a portfolio type which is recordable by a student, or a hybrid type which is a mixture of the normal type and the portfolio type based upon respective student abilities.

In still another embodiment of the method for producing an educational material according to the present invention, said selecting and producing step comprises generating a guide to teaching and/or an evaluation sheet based upon the inputted student-related data, educational environment-related data, the selected raw materials, or produced educational material.

In still another embodiment of the method for producing an educational material according to the present invention, said guide to teaching and/or said evaluation sheet is stored in a teacher-client, when the teacher-client is connected to a student-client, status information which includes leaning progress and learning outcome of the student about the produced educational material stored in the student-client is automatically transmitted from the student-client to the teacher-client to record the status information into the evaluation sheet.

DETAILED DESCRIPTION OF THE PREFERRED EMBODIMENTS

Several preferred embodiment of the systems for producing an educational material according to the present invention will be described with reference to the accompanying drawings.

Figure 1:
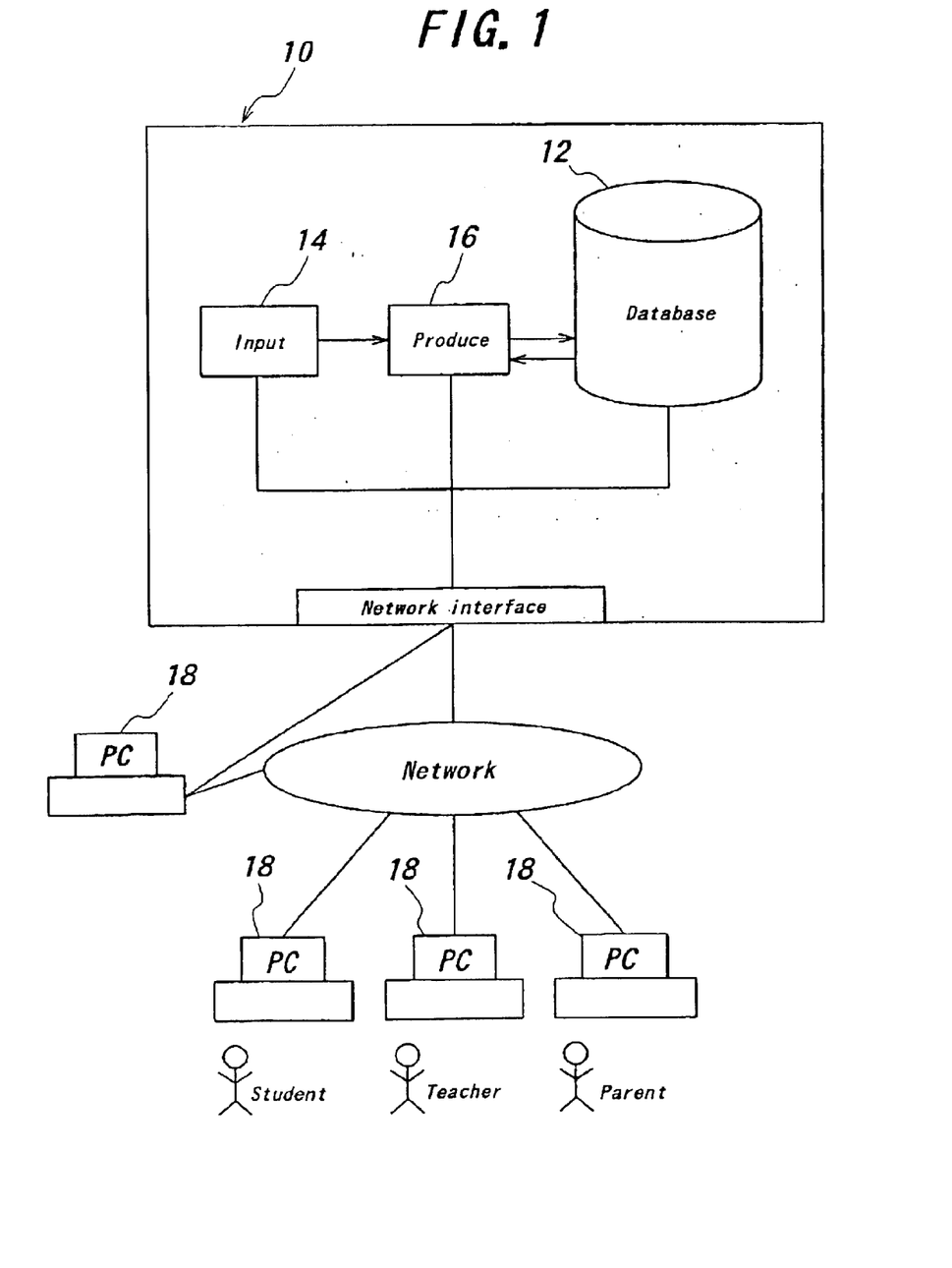
FIG. 1 is a block diagram showing a basic configuration of the system for producing an educational material according to the invention.

FIG. 1 is a block diagram showing a basic configuration of the system for producing an educational material according to the invention. As shown in FIG. 1, the present system 10 for producing an educational material comprises a database 12, input means 14, and means 16 for producing an educational material. The database 12 has been loaded with various raw educational materials, which will be selected and incorporated into an educational material, such as text and image data. The input means 14 prompts teacher client PC 18, which is connected to the network interface of the present system via a network such as Internet, to input student-related data and educational environment-related data. The means 16 for producing an educational material selects at least one raw educational material from said database 12 in accordance with the inputted student-related data and educational environment-related data to generate an educational material, which is customized for a target student, from the selected raw educational material. The present system 10 distributes the generated educational material to respective client PC, which is a local or remote terminal, via a network. Although the generated educational material can be utilized just as it is, it can be modified by a teacher or a parent to fit more closely the target student.

Figure 2:
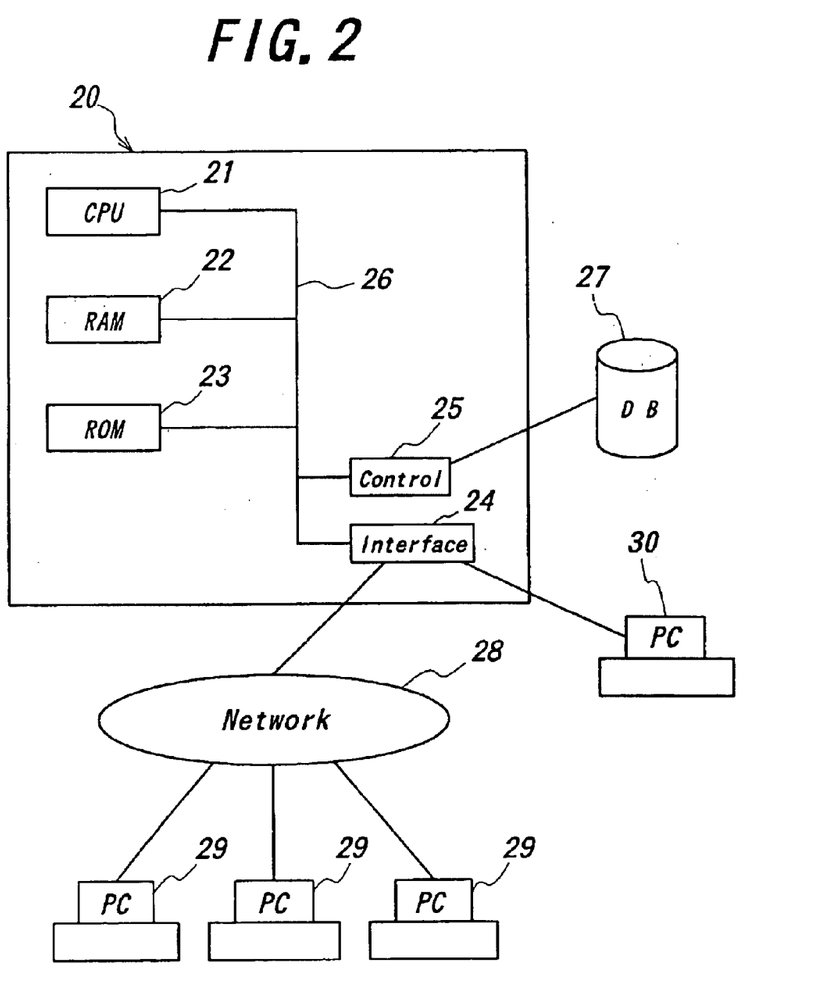
FIG. 2 is a block diagram illustrating the basic arrangement of a computer system which allows to operate the system for producing an educational material according to the invention.

FIG. 2 is a block diagram illustrating the basic arrangement of a computer system which allows to operate the system for producing an educational material according to the invention. As illustrated in FIG. 2, a computer system 20 comprises a processor 21, a RAM 22, a ROM 23, a network interface 24, an auxiliary storage controller 25 and a system bus 26. The each of elements such as RAM 22 in the computer system 20 is connected via system bus 26 to each other. The computer system 20 is connected via the auxiliary storage controller 25 to an auxiliary storage 27. The auxiliary storage 27 or the ROM 23 has stored program embodying the method of the present invention, a large number of raw educational materials, and predetermined selecting criteria. Before to operate, the program is loaded into the RAM 22, then the program are executed in the processor 21. The computer 20 is connected via the network interface 24 to network 28 such as Internet and likewise is connected to a remote terminal 19 connected with the network 18. The computer 20 is connected via the network interface 24 to a client PC (or terminal) 29 or to a remote terminal 30. The client PC 29 or the remote terminal 30 is used for presenting any information provided by the educational material.

Figure 3:
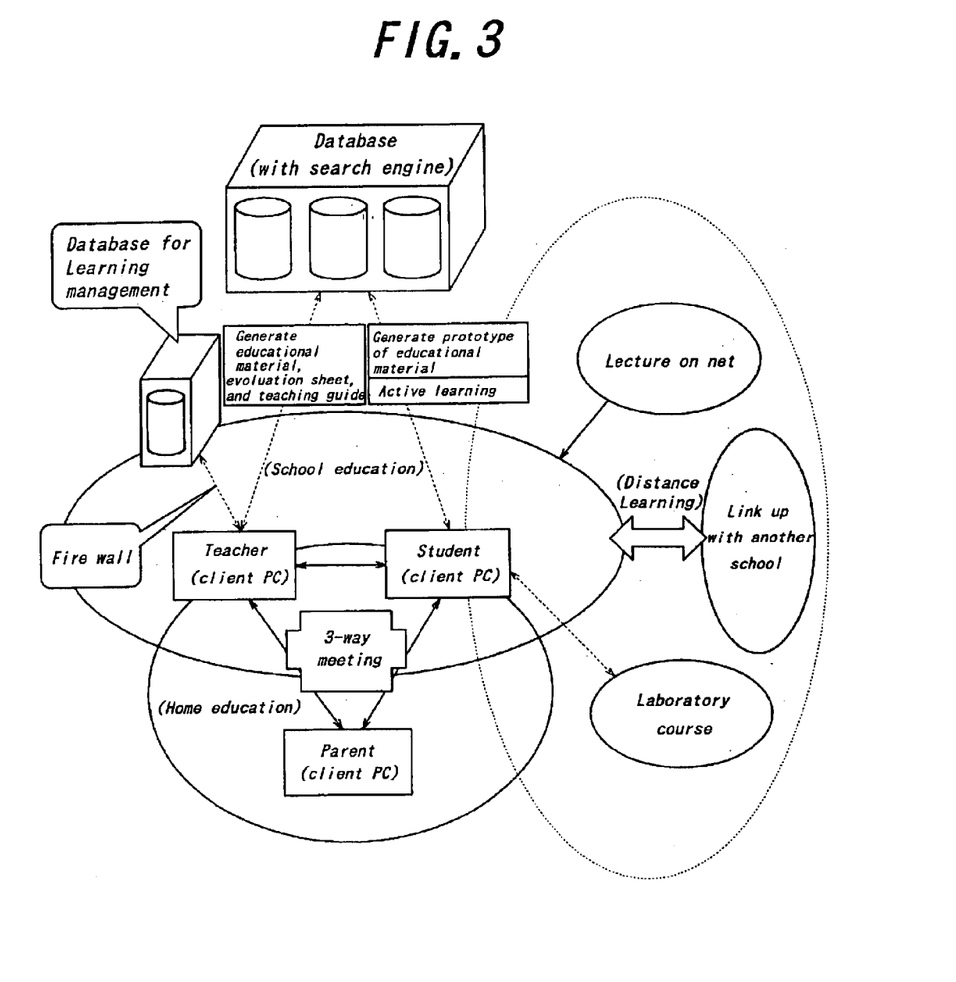
FIG. 3 is a block diagram depicting a concept of the learning environment realized by the system for producing an educational material according to the invention.

FIG. 3 is a block diagram schematically depicting a concept of the learning environment realized by the system for producing an educational material according to the invention. As depicted in FIG. 3, the database with a search engine comprises one or more databases which are connected via a network. The database stores various raw educational materials, selection criteria, and the generated educational materials with both evaluation sheets and teaching guides. The said database can be a general database, a database dedicated for education, or a pay or free database. The database dedicated for education may have filtering function to filtering handful contents. The database dedicated for learning management shown in FIG. 3 can be accessible by authorized person such as a teacher in charge and can block unauthorized access using a firewall. The database dedicated for learning management can store student-related information and educational environment-related information such as personal information about respective students or teachers, learning outcomes about students, teaching skills about teachers, lesson histories of every student, and educational environment of schools. The said database dedicated for education may be incorporated into the main database. Information stored in these databases is classified into several classes by accessibility. For instance, some of the classes are restricted to rewrite by only authorized person. When files (i.e. information) in the databases are updated, the present system may gather static information for evaluation such as updaters, timestamps, changes and used time to record them as hidden files. Such static information may be added to the file which is updated. Alternatively, Such static information may be embedded into the file which is updated using known watermarking techniques.

Figure 4:
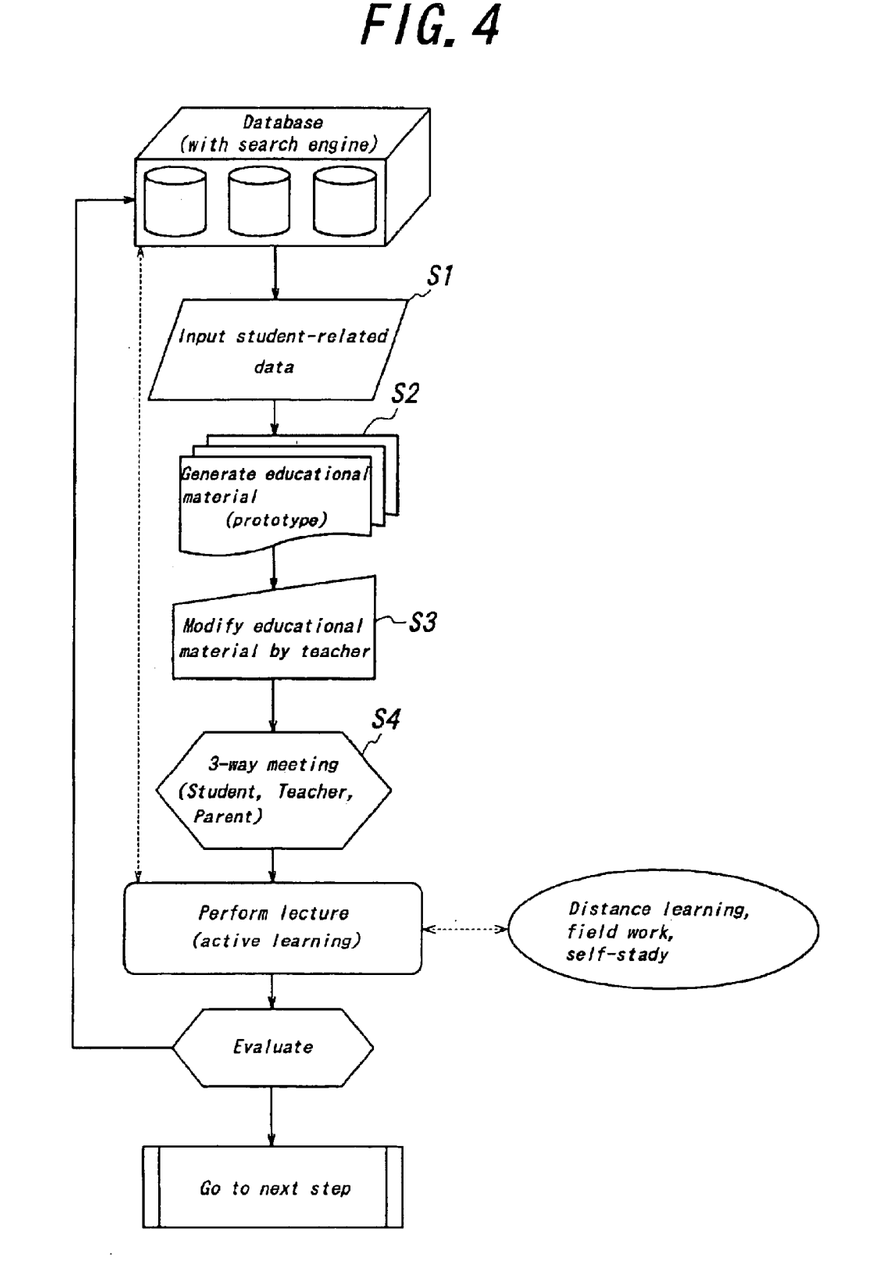
FIG. 4 is a flowchart showing an exemplary method of producing an educational material according to the invention.

FIG. 4 is a flowchart showing an exemplary method of producing an educational material according to the invention. As shown in FIG. 4, at a step S1, the present system prompts a teacher (or a student, or parents) to input both student-related data, which is related to a targeted student for providing an educational material, and educational environment-related data. The present system may provide menu-oriented user interface to prompt users to select any options such as ages or subject names.

At a step S2, the present system selects at least one raw educational material from the database in accordance with the inputted student-related data, educational environment-related data, and selection criteria for selecting raw educational materials. The present system then generates an educational material, which is customized for the target student or class, from the selected raw educational materials. The present system further automatically generates an evaluation sheet, a teaching guide sheet and "a school-to-home communication sheet", which are used by teachers or parents, in accordance with the inputted data, the generated educational material, and predetermined criteria for making the sheet. At this moment the generated educational material is a prototype and thus it can be modified by a student, a teacher or a parent. The educational material can be a "soft copy" image on some form of electronic display, a printout, or any other appropriate medium. The each of elements consisting of the educational material (i.e. raw educational material) can be a text, a still image, a motion picture, an illustration, a photograph, a figure, a graph or a sound.

At a step S3, the generated educational material is presented to a teacher. If necessary the teacher modifies the educational material. For instance, the teacher checks a plot, a context, a layout, a design, a fitness to the targeted student with respect to the educational material to modify any parts of the educational material or replace any parts of it with manually selected raw educational data.

At a step S4, the teacher discusses the modified educational material with both the student and the parents to modify it till the student fully satisfied with it. The teacher further may change contents or construction of the educational material in consideration of respective students.

The present system generates a teaching guide sheet including aim of lesson and an evaluation sheet as well as the educational material.

The present system collects the evaluation data from the student client PC to record them into both the evaluation sheet and teaching guide sheet with respect to each chapter or unit. The teacher gives a lecture using the educational material in view of the evaluation information in the evaluation sheet or teaching guide sheet.

The present system further may give an examination to students to evaluate learning outcomes about the lessons provided by the educational material. The present system may send a file for examination with a start signal to the client PC. On receiving the start signal the student can open the file to fill out answers to questions. After the lapse of a predetermined period, the file is automatically closed to record the answers on a hidden file. Afterwards the hidden file which stores the answers is transmitted to the present system. In this way, the system can give the test to evaluate for the student who study using the educational material.

The present system may provide various examinations such as an essay examination, a true-false test, or a multiple choice test. The present system utilizes an automated marking system to lighten teacher's burden.

After the student bas learned the educational material, the teacher would confirm achievements based upon the evaluation sheet and the student and parents would respond to satisfaction surveys about the educational material and teaching skill of the teacher. Such information will be recorded in the database dedicated for education.

Figure 5:
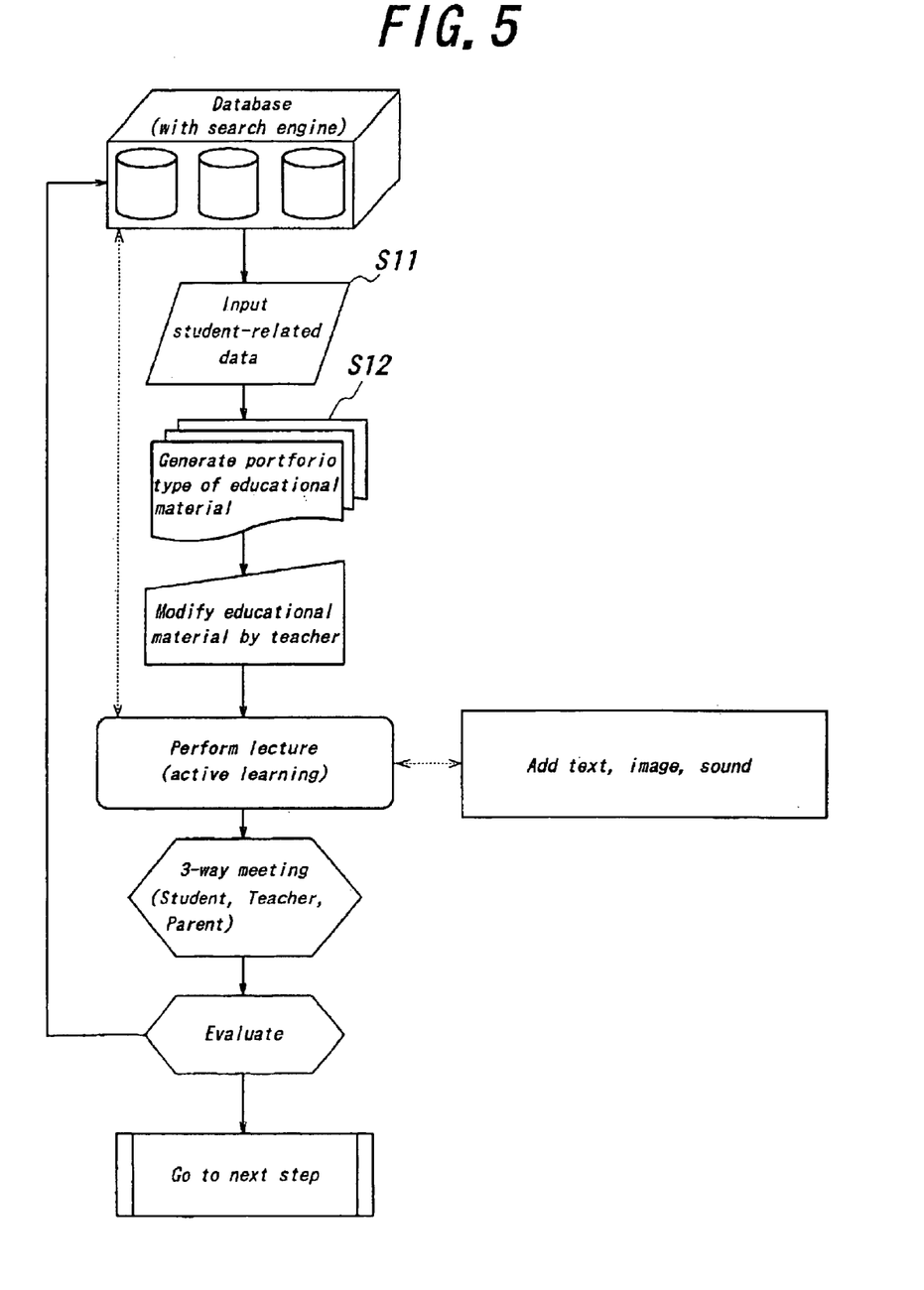
FIG. 5 is a flowchart illustrating an exemplary method for producing a self-supported educational material according to the invention.

FIG. 5 is a flowchart illustrating an exemplary method for producing a self-supported educational material according to the invention;

As illustrated in FIG. 5, at a step S11, the present system prompts a teacher (or a student or parents) to input both student-related data, which is related to a targeted student for providing an educational material, and educational environment-related data. At a step S12, the present system selects at least one raw educational material from the database in accordance with the inputted student-related data, educational environment-related data, and selection criteria for selecting raw educational materials. The present system then automatically generates a portfolio type of educational material, which is customized for the target student or class, from the selected raw educational materials. The computerized portfolio type of educational material is recordable by a student, a teacher or parents. In other words, the computerized portfolio type textbook has many blank spaces. Thus the textbook is voluntary filled any useful data along with a course object by the student. Educational level of the textbook is determined based upon both respective abilities and motivation for learning of students. For the targeted student who has high learning ability, a positive attitude, and high motivation for learning, the portfolio type textbook will have many blank spaces. The portfolio type textbook has a list of recommended books and URLs. The student uses the URLs to do "active learning" to fill out the blank spaces in the portfolio textbook. The present system collects the recorded data, which is filled out by the student, from the portfolio textbook to evaluate it. The teacher then gives advice and appreciation to the student based upon the evaluation.

Figure 6:
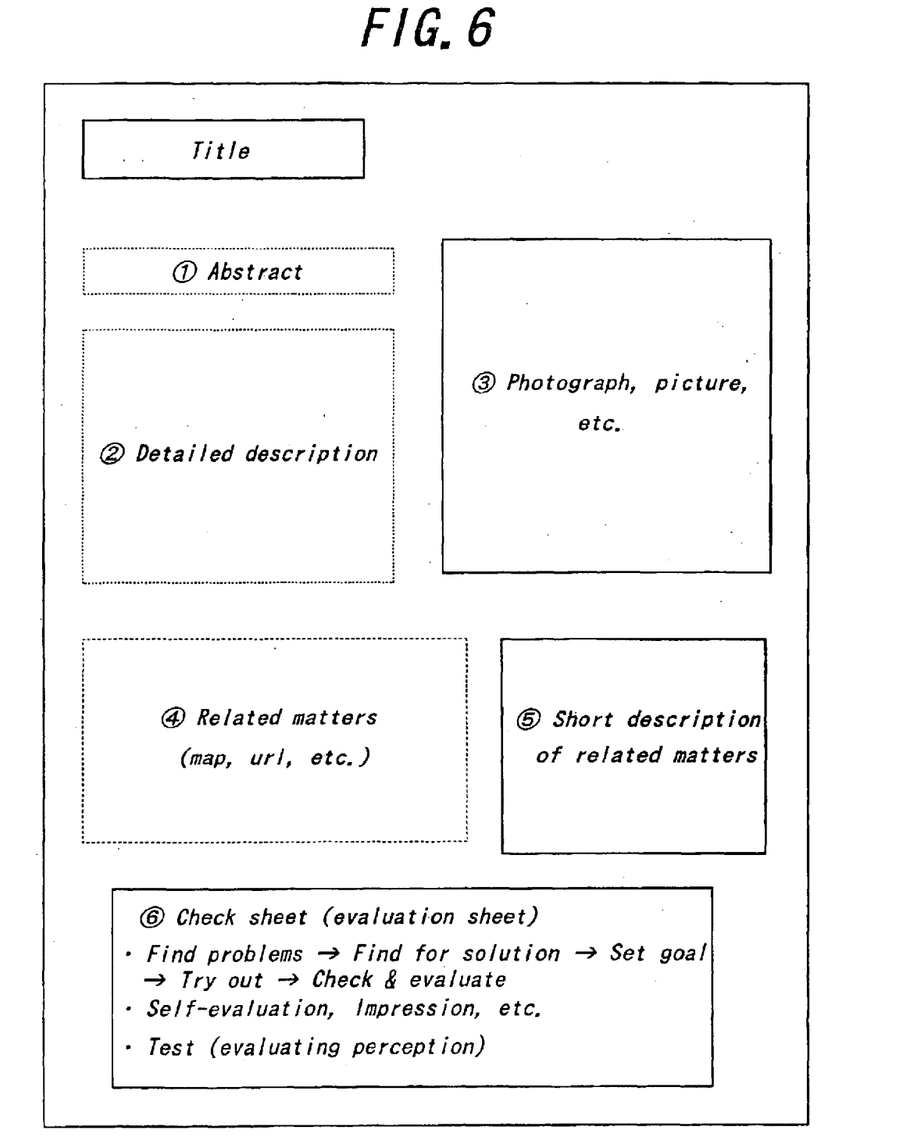
FIG. 6 is a screen interface for displaying the content of the educational material produced by the present system.

FIG. 6 is a screen interface for displaying the content of the educational material produced by the present system. The present system automatically selects adequate raw educational materials form the database in accordance with both the inputted student-related data and educational environment-related data to lay out them on a screen interface. As shown in FIG. 6, the screen interface has a title section, an abstract section, a detailed description section, a visual section, a related matters section, and a check sheet section. The layout can be determined based upon a predetermined edit pattern. Additionally, the layout shown in FIG. 6 is based upon a standard edit pattern for education. For history textbook, contents, for example, will be a historic event, its location, detailed description, figures explaining the event, and related URLs. Volume (i.e. number of pages) of the textbook can be determined in accordance with the material selection criteria, which includes allocated time for respective subjects. The check sheet section can be used to write some data such as impression, findings or the like. Additionally, the section also is used to develop both positive attitude and by finding problems to solve them.

After the educational material is utilized by the student and the teacher, evaluation examination is performed to evaluate learning outcomes of the student. When the educational material is a normal type, the test is typically performed in such way that the present system provides a screen interface for displaying some questions to client PC of the student to prompt the student to answer the questions. When the educational material is a portfolio type, the test is typically performed in such way that the student makes a presentation based on his portfolio textbook which has been recorded his original useful information such as his findings about the subject.

Figure 7:
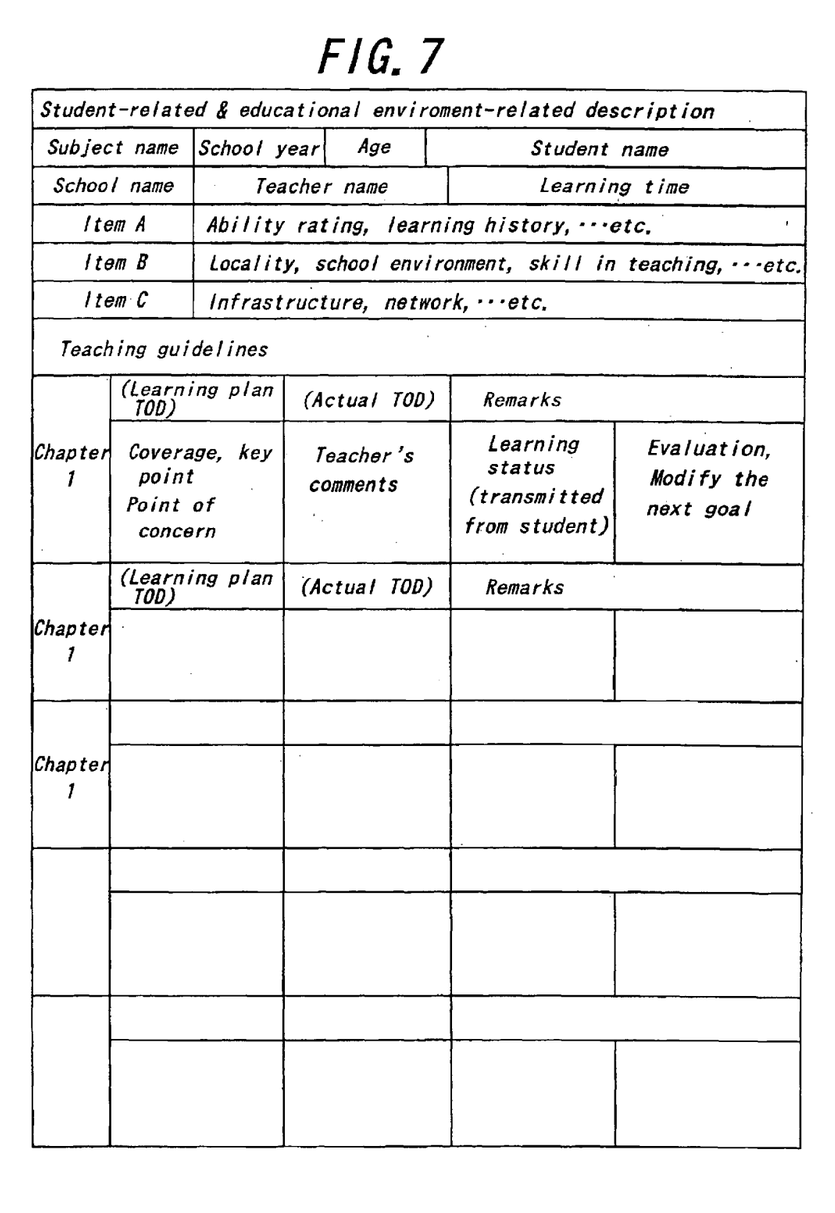
FIG. 7 is a table showing configuration of the teaching guide sheet generated by the present system.
Figure 8:
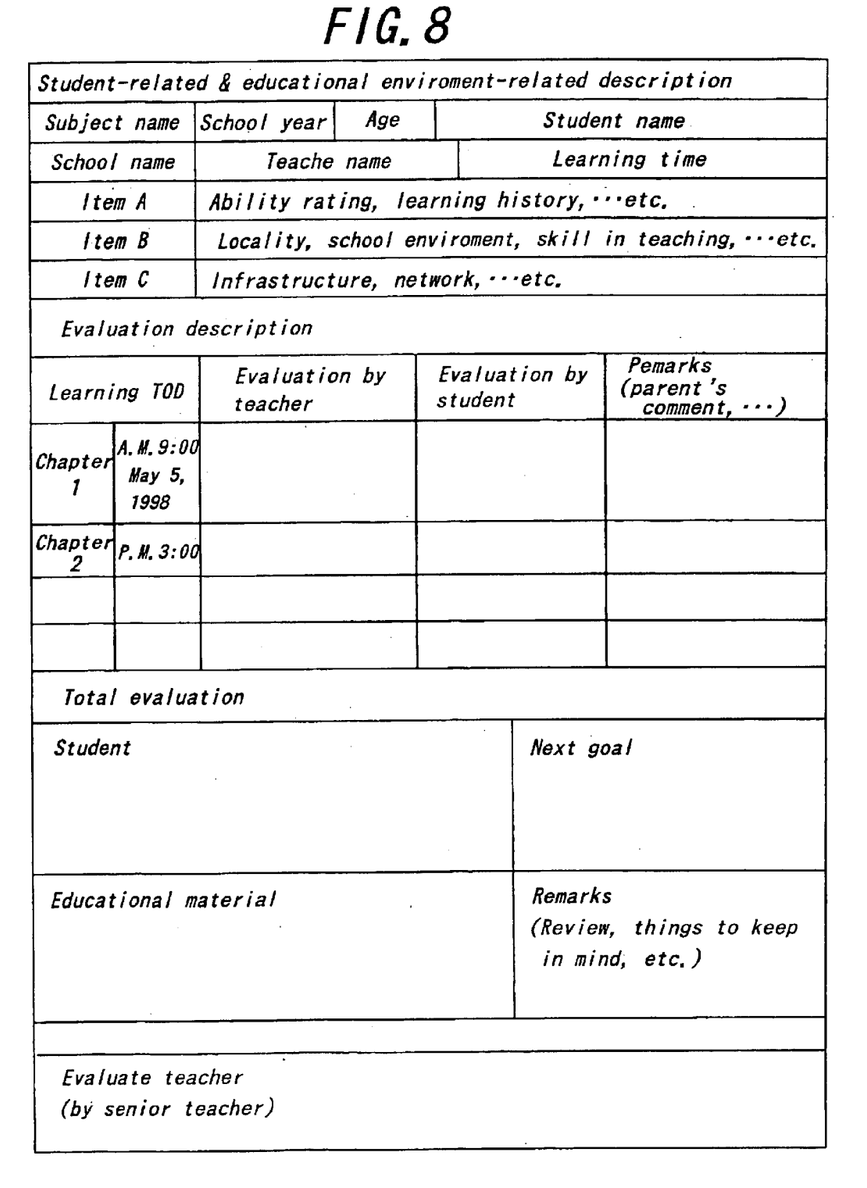
FIG. 8 is a table showing configuration of the evaluation sheet generated by the present system.

FIG. 7 is a table showing configuration of the teaching guide sheet generated by the present system and FIG. 8 is a table showing configuration of the evaluation sheet generated by the present system.

This evaluation sheet and teaching guide sheet are generally provided to the teacher's client PC to store therein. As shown in FIGS. 7 and 8, the sheets include student-related and educational environment-related data such as name, age of the student by each subject or each credit hour. The teaching guide sheet has a teaching guide section, which includes a learning plan or a learning coverage. The evaluation sheet has an evaluation description section, which includes evaluations by a teacher, a student and parents.

Industrial Applicability

The advantages of the device according to present invention are summarized as follows:

(1) The present system can easily and effectively provide a computerized educational material, which is customized to each student based upon respective student's abilities.

(2) The present system can be used as a distance learning system to provide customized educational materials to users at remote locations via Internet.

(3) The present system can easily evaluate learning outcomes of the student.

The above-described systems are exemplary. By way of easily explanation the aspect of the present invention has been mainly described as systems i.e. devices, however it is understood that the present invention may be realized as methods corresponding to the systems, programs embodying the methods as well as a storage media storing the programs. Therefore, it should be appreciated that those skilled id the art will be able to devise numerous embodiments which, although not explicitly shown or disclosed herein, embody the principles of the invention and are thus within the spirit and scope of the present invention. Although the present systems have been described as the components or functions are distributed in distributed computing style between the server and client PC, but can be integrated into one server and can be rearranged without contradiction.

What is claimed is:

1. A system for generating a customized educational document for a student, the system comprising:
   a storing device for storing raw educational materials and predetermined selecting criteria;
   an input device for inputting student-related data and educational environment-related data;
   a computer having a processor, the computer connected to a student terminal for presenting the customized educational document to a student; and
   a computer program for generating said customized educational document, the computer program executable by the processor:
   (1) to select a set of material from the raw educational materials, the selection being based on the predetermined selecting criteria and the inputted student-related data and educational environment-related data; and
   (2) to generate a customized educational document being any one of:
      (a) a textbook containing information for student reference;
      (b) a worksheet or workbook having empty input fields for recording student work therein; and
      (c) a mixture of a textbook of type (a) and a worksheet or workbook of type (b).

2. The system according to claim 1, wherein the student-related data includes information corresponding to at least one of a subject, an academic year, an age, a learning ability, and a learning history.

3. The system according to claim 1, wherein the educational environment-related data includes information corresponding to at least one of a personality, ability to teach, years of experience, achievement of a teacher, an environment of a school or home, geographical location, and culture or history of where a student lives.

4. The system according to claim 1, wherein said educational document or said raw educational materials includes at least one of a text element, a still image element, a motion picture element, an illustration element, a photograph element, a figure element, a graph element, and a sound element.

5. The system according to claim 1, wherein said computer program is further operable to generate a guide to teaching or an evaluation sheet based upon the inputted student-related data and educational environment-related data, the selected raw materials, or the generated educational document.

6. The system according to claim 5, further comprising a network interface to provide remote access to the system, wherein:
   said network is accessible by a teacher terminal; and
   said computer program is further operable to store said guide to teaching or said evaluation sheet in said teacher terminal.

7. The system according to claim 6, wherein an evaluation sheet is stored in the teacher terminal;
   wherein the teacher terminal is connected to the student terminal, and the computer program is operable to automatically transmit status information from the student terminal to the teacher terminal to record status information into the evaluation sheet, said status information including a learning process and a learning outcome of the student resulting from the generated educational document presented on the student terminal.

8. A method for automatically generating a customized educational document for a student, the method comprising:
   storing raw educational materials and predetermined selecting criteria in a storing device;
   inputting student-related data and educational environment-related data to a computer;
   selecting a set of material from the raw educational materials, the selection being based on the predetermined selecting criteria and the inputted student-related data and educational environment-related data;
   generating a customized educational document containing the selected set of material; and
   presenting the customized educational document to a student on a student terminal connected via a network to the computer; wherein:
      the steps of selecting, generating and presenting are performed by a computer program in the computer; and
      the customized educational document is any one of:
         (a) a textbook containing information for student reference;
         (b) a worksheet or workbook having empty input fields for recording student work therein; and
         (c) a mixture of a textbook of type (a) and a worksheet or workbook of type (b).

9. The method according to claim 8, wherein the student-related data includes information corresponding to at least one of a subject, an academic year, an age, a learning ability, and a learning history.

10. The method according to claim 8, wherein the educational environment-related data includes information corresponding to at least one of a personality, ability to teach, years of experience, achievement of a teacher, an environment of a school or home, geographical location, and culture or history of where a student lives.

11. The method according to claim 8, wherein said educational document or said raw educational materials includes at least one of a text element, a still image element, a motion picture element, an illustration element, a photograph element, a figure element, a graph element, and a sound element.

12. The method according to claim 8, further comprising generating a guide to teaching or an evaluation sheet based upon the inputted student-related data and educational environment-related data, the selected raw materials, or the generated educational document.

13. The method according to claim 12, further comprising storing said guide to teaching or said evaluation sheet in a teacher terminal.

14. The method according to claim 13, wherein storing of the evaluation sheet in the teacher terminal comprises:

automatically transmitting status information from a student terminal to the teacher terminal; and recording the status information into the evaluation sheet, said status information including learning process and learning outcome of the student resulting from the generated educational document presented on the student terminal.

* * * * *